(12) United States Patent
Lyons

(10) Patent No.: US 10,228,773 B2
(45) Date of Patent: Mar. 12, 2019

(54) THREE-DIMENSIONAL AUGMENTED REALITY OBJECT USER INTERFACE FUNCTIONS

(71) Applicant: Merge Labs, Inc., San Antonio, TX (US)

(72) Inventor: Franklin A. Lyons, San Antonio, TX (US)

(73) Assignee: Merge Labs, Inc., San Antonio, TX (US)

( * ) Notice: Subject to any disclaimer, the term of this patent is extended or adjusted under 35 U.S.C. 154(b) by 0 days.

(21) Appl. No.: 15/860,484

(22) Filed: Jan. 2, 2018

(65) Prior Publication Data

US 2018/0188831 A1    Jul. 5, 2018

Related U.S. Application Data

(60) Provisional application No. 62/469,292, filed on Mar. 9, 2017, provisional application No. 62/441,525, filed on Jan. 2, 2017.

(51) Int. Cl.
| | |
|---|---|
| *G06F 3/041* | (2006.01) |
| *G06F 3/0346* | (2013.01) |
| *G06F 3/0484* | (2013.01) |
| *G06F 3/03* | (2006.01) |
| *G06F 3/0481* | (2013.01) |
| *G06T 19/00* | (2011.01) |

(52) U.S. Cl.
CPC .......... *G06F 3/0346* (2013.01); *G06F 3/0317* (2013.01); *G06F 3/04815* (2013.01); *G06F 3/04845* (2013.01); *G06T 19/006* (2013.01); *G06T 2200/24* (2013.01)

(58) Field of Classification Search
CPC .......... A61B 5/055; A61B 5/721; G09G 5/18; G06F 3/0317; G06F 3/0346
USPC ................... 345/473; 382/100, 103
See application file for complete search history.

(56) References Cited

U.S. PATENT DOCUMENTS

| | | | |
|---|---|---|---|
| 8,814,048 | B2 | 8/2014 | Taylor |
| 2005/0276444 | A1 | 12/2005 | Zhou et al. |
| 2007/0171194 | A1 | 7/2007 | Conti et al. |
| 2012/0049453 | A1* | 3/2012 | Morichau-Beauchant ................. A63F 3/00214 273/236 |
| 2015/0130836 | A1 | 5/2015 | Anderson |

(Continued)

OTHER PUBLICATIONS

World Intellectual Property Organization, International Application No. PCT/US2018/012110, dated Mar. 26, 2018, 6 total pages.

*Primary Examiner* — Calvin C Ma
(74) *Attorney, Agent, or Firm* — Socal IP Law Group LLP; Jonathan Pearce; Steven C. Sereboff

(57) ABSTRACT

There is disclosed an apparatus comprising processor and memory and a three-dimensional object bearing at least two, unique fiducial markers, the processor executing instructions which cause the processor to generate a three-dimensional environment including a user interface element for interacting with the three-dimensional environment, detect rotational movement of the three-dimensional physical object using the at least two unique fiducial markers, and update the user interface element within the three-dimensional environment based upon the rotational movement of the three-dimensional physical object.

20 Claims, 10 Drawing Sheets

© 2018 Merge Labs, Inc.

(56) References Cited

U.S. PATENT DOCUMENTS

2016/0166333 A1\* 6/2016 Wang ............... A61B 34/10
 600/476
2016/0345917 A1\* 12/2016 Daon ............... A61B 6/032

\* cited by examiner

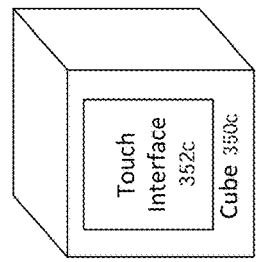
FIG. 3A
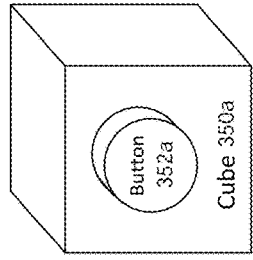
FIG. 3D
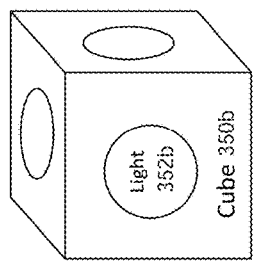
FIG. 3B
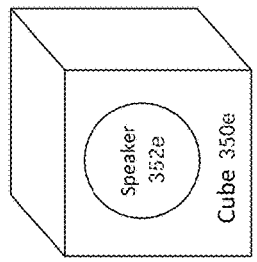
FIG. 3E
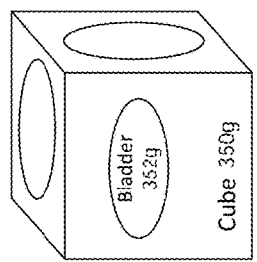
FIG. 3G
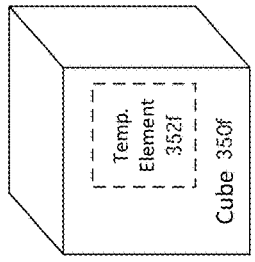
FIG. 3C
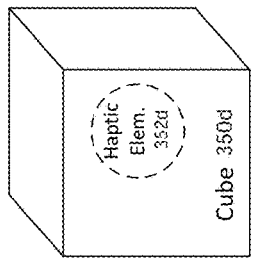
FIG. 3F
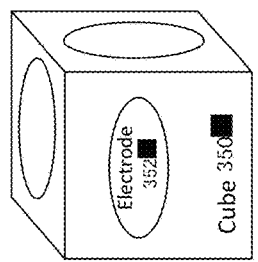
FIG. 3H
FIG. 3

US 10,228,773 B2

THREE-DIMENSIONAL AUGMENTED REALITY OBJECT USER INTERFACE FUNCTIONS

RELATED APPLICATION INFORMATION

This patent claims priority from the following provisional patent applications:

U.S. provisional patent application No. 62/441,525 entitled "Augmented Reality Fiducial Marker" filed Jan. 2, 2017 which is incorporated by reference.

U.S. provisional patent application No. 62/469,292 entitled "Three-Dimensional Augmented Reality Object and Associated Functions" filed Mar. 9, 2017 which is incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to augmented and virtual reality and, more particularly, to interactions with user interfaces and augmented reality and virtual reality environments and objects.

Description of the Related Art

Augmented and virtual reality have become ubiquitous in the news and technology press since approximately 2012. However, both have intermittently been popular for several years, with interest waning, and returning several years later over the course of the last thirty to forty years. The primary reason that the technology has drawn excitement, but failed to retain that excitement due to its prohibitive cost.

Augmented reality (AR) is the blending of the real world with virtual elements generated by a computer system. The blending may be in the visual, audio, or tactile realms of perception of the user. AR has proven useful in a wide range of applications, including sports, entertainment, advertising, tourism, and education. As the technology progresses it is expected that it will find an increasing adoption within those fields as well as adoption in a wide range of additional fields.

Throughout the 1980's and 1990's film and media glamorized the coming technological revolution that would result from virtual reality technology. However, the systems necessary to use virtual reality often cost multiple thousands of dollars. Thus, the public never widely adopted the technology.

Even now, with the drastic price reductions brought on by the ubiquity of small, high-quality screens and motion sensors used in modern smart phones, virtual reality and augmented reality remain relatively obscure. One major, final problem remains in the way of widespread virtual reality and augmented reality adoption by the public. How does one interact with a virtual reality or augmented reality environment? In the not-too-distant future, every individual may have haptic suits and haptic gloves that provide physical feedback simulating the virtual or augmented reality environment in which a user is in or experiencing. But, those types of systems are still years off.

The most common interactive systems today are hand-held controllers like those of the PSVR® or the Oculus® Touch®. The problems with both of these systems is that their price points are in the hundreds of dollars and, oftentimes, the controllers are not included in the cost of the associated PSVR® headset or Oculus® Rift® headset. And, neither include the cost of the PlayStation® or the computer necessary to use the Oculus® Rift®. As a result, a user wishing to not only "see" virtual or augmented reality must pay on the order of one thousand or several thousand dollars just to enjoy the full augmented reality or virtual reality experience.

What is needed is an inexpensive, but highly-accurate system or device that may be tracked using widely-available technology so as to act as a controller or user interface extension for augmented and virtual reality devices. Mobile-based AR and VR systems like the Google® Daydream® have tried this by including a single-click remote in their overall package. At prices less than $100, these are certainly more attractive to a general audience, but still remain prohibitive for a majority of the public. A better, less-expensive technology should be possible and should provide a high-quality user experience enabling detailed interactions across multiple devices. And, detailed control schemes for augmented and virtual reality environments should exist using such a technology, without necessarily requiring a complex nest of systems and trackers.

DESCRIPTION OF THE DRAWINGS

FIG. 3, made up of FIGS. 3A-3H, are a series of cubes, each including different elements that may be used for interactivity with an augmented reality environment.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
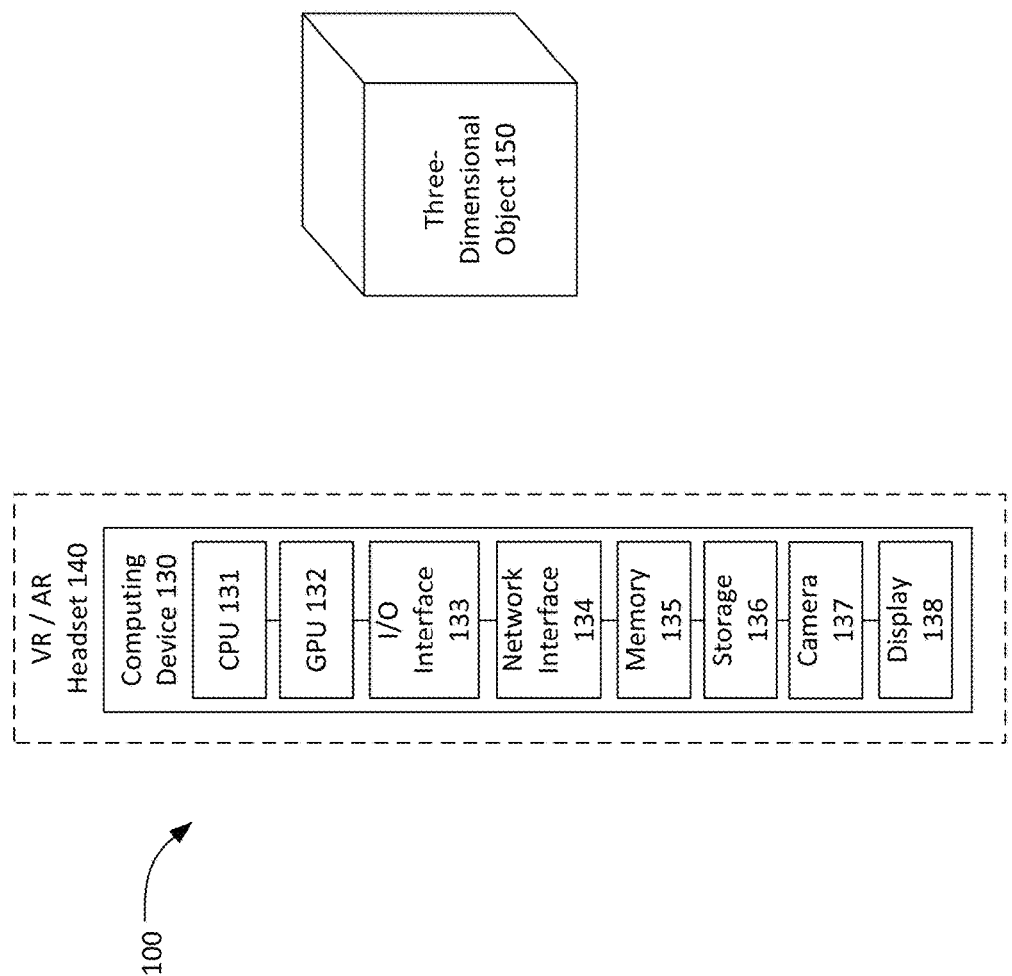
FIG. 1 is a system for interacting with an augmented reality environment using a three-dimensional object.

Referring now to FIG. 1, a system 100 for interacting with an augmented reality environment using a three-dimensional object is shown. The system 100 includes a computing device 130 and a three-dimensional object 150. The system, optionally, includes a VR/AR headset 140. Multiple computing devices may be used, but only one is required.

The computing device 130 includes a central processing unit (CPU) 131, a graphics processing unit (GPU) 132, an input-output (I/O) interface 133, a network interface 134, memory 135, storage 136, a camera 137, and a display 138.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or a system-on-a-chip (SOCs). The CPU 131 may be specialized, designed for operations upon visual, graphical, or audio data or may be general purpose processors. Though identified as a central processing unit, the CPU 131 may in fact be multiple processors, for example multi-core processors or a series of processors joined by a bus to increase the overall throughput or capabilities of the CPU 131. For purposes of performing the tracking described here, the CPU may be, in whole or in part, an all-in-one "motion chip" designed expressly for the purpose of enabling three-dimensional object tracking.

The GPU 132 may execute instructions suitable for enabling the functions described herein. In particular, the GPU 132 may be used in connection with particular image-related operations which the GPU 132 is uniquely suited to perform such as rendering or complex mathematical calculations related to object detection and computer vision. The GPU 132 may be any of the things that the CPU 131 is. However, the GPU 132 is distinct in that it is a specialized processor that is designed for the purpose of processing visual data, particularly vector and shading operations, performs faster memory operations and access, and is capable of performing specialized lighting operations within rendered three-dimensional environments. The instruction sets and memory in the GPU 132 are specifically designed for operation upon graphical data. In this way, the GPU 132 may be especially suited to operation upon the image data or to quickly and efficiently performing the complex mathematical operations described herein like the CPU 131, the GPU 132 is shown as a single graphics processing unit, but may actually be one or more graphics processing units in a so-called multi-core format or linked by a bus or other connection that may together be applied to a single set of or to multiple processing operations.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The I/O interface 133 may be used to communicate with and direct the actions of optional, external sensors such as additional cameras, lights, infrared lights, or other systems used for or in the process of performing computer vision detection and other operations on the three-dimensional object 150.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

The camera 137 is an electronic device capable of capturing ambient light to produce an image of those objects within its view. The camera 137 is shown as a single camera, but may be a dual- or multi-lens camera. Likewise, the word camera is used generally to describe the camera 137, but the camera 137 may include infrared lighting, a flash or other pointed light source, an infrared camera, depth sensors, light sensors, or other camera-like devices capable of capturing images or detecting three-dimensional objects within range of the camera 137. Though camera 137 is described as a visual imaging camera, it may actually be or include additional or other capabilities suitable for enabling tracking. For example, lasers and/or sound may be used to perform object tracking using technologies like LIDAR and Sonar. Though neither technology involves a "camera" per se, both may be used to augment or to wholly perform object tracking in three-dimensional space.

The display 138 is an electronic device that incorporates electrically-activated components that operate to form images visible on the display. The display 138 may include backlighting (e.g. an LCD) or may be natively lit (e.g.

OLED). The display 138 is shown as a single display but may actually be one or more displays. Other displays, such as augmented reality light-field displays (that project lights into three-dimensional space or appear to do so, or other types of projectors (actual and virtual) may be used.

The display 138 may be accompanied by lenses for focusing eyes upon the display 138 and may be presented as a split-screen display to the eyes of a viewer, particularly in cases in which the computing device 130 is a part of a VR/AR headset 140.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g. a multicore process or group of multicore processors) or a group of GPUs (e.g. a single powerful GPU or a set of GPUs interconnected by SLI or CrossFire®) such that a connected computing device is better-capable of performing processor-intensive tasks. Or, a capture device (e.g. camera and associated processor and memory) in the form of a VR or AR headset or simply a mobile device including a display and a camera) may be distinct from a rendering device such as a desktop computer or other computing device more-capable of performing some or all of the functions described below. In some implementations, the one or more additional computing devices may be used to perform more processor-intensive tasks, with the tasks being offloaded via the I/O interface 133 or network interface 134.

The VR/AR headset 140 is an optional component that may house, enclose, connect to, or otherwise be associated with the computing device 130. The VR/AR headset 140 may, itself, be a computing device, connected to a more-powerful computing device Or, the VR/AR headset 140 may be a stand-alone device that performs all of the functions discussed herein, acting as a computing device 130 itself.

Though not required for the functions described herein, a more immersive augmented reality or virtual reality experience may be had using a VR/AR headset 140. When functioning as an augmented reality headset, the VR/AR headset 140 may incorporate an outward-facing camera that provides a real-time image of the exterior of the VR/AR headset 140 to a wearer with augmented reality objects interspersed on the display 138. Alternatively, if a VR/AR headset 140 is not present, a mobile device, or tablet, or other hand-held display and camera combination can function as a "portal" through which augmented reality or virtual reality may be seen. Although discussed generally herein in connection with an "augmented reality," when the words "augmented reality" are used, it should be understood that this also encompasses so-called "virtual reality," "mixed reality," and other experiences involving the combination of any real object with a three-dimensional immersive environment or experience.

The three-dimensional object 150 is a physical object, placed in the world at a position or held by a user in a particular position. The three-dimensional object 150 has characteristics that are suitable for detection using computer vision techniques and, preferably, are of a type that is robust for use at different positions (e.g. close-up, arm's length, across a room), and that enable rapid detection when presented to a computing device 130 and camera 137.

The three-dimensional object 150 is preferably a cube, but may take other shapes. A cube has several characteristics that make it uniquely suitable for these purposes. Notably, only six sides are present, but each of the six sides may be unique and relatively differentiable from one another. For example, only six colors are required for differentiation based upon color-use or lighting-use of particular colors. This enables computer vision algorithms to easily detect which side(s) are facing the camera 137. Similarly, computer-readable (or merely discernable) patterns may be applied to each side of a cube without having to account for more than a total of six faces. If the number of faces is increased, the complexity of detection of a particular side—and differentiating it from other sides or non-sides—increases as well. Also, the total surface area for a "side" decreases as more sides are added, making computer vision side-detection algorithms more difficult, especially at different distances from the camera, because only so many unique patterns or colors may be included on smaller sides.

Similarly, if fewer sides are used (e.g. a triangular pyramid), then it is possible for only a single side to be visible to computer vision at a time and, as the pyramid is rotated in any direction, the computer cannot easily predict which side is in the process of being presented to the camera. Therefore, it cannot detect rotational direction as easily. And, more of each "side" is obscured by individuals holding the three-dimensional object 150 because it simply has fewer sides to hold. This, again, makes computer vision detection more difficult.

Yet another benefit of a cube is that its six sides map easily to readily-understood human interactions with the three-dimensional world. Specifically, the sides nicely map to up, down, left, right, forward and backward. So, when held with a face of the cube facing the user, a person's experience of the cube corresponds well, virtually and actually, with his or her experience of the real world. This makes for easier translation into an augmented reality or virtual reality environment.

Regardless, three-dimensional objects of any number of sides may be used. But, cubes present unique properties that make them more-suitable to certain applications, particularly to hand-held applications. Still, when "cube" is indicated herein, any three-dimensional object of four faces or more may be substituted.

Finally, though described as primarily passive in this application, the three-dimensional object may include its own computing device 130 with varying levels of power, sophistication, and capabilities. In some cases, the three-dimensional object may incorporate a camera or infrared camera, lights, positional and rotational sensors, Bluetooth, RFID, WiFi and/or other systems for detecting its own position relative to an exterior room or device (e.g. the computing device 130) and for communicating that information to the computing device 130. In some cases, the three-dimensional object may take over some or all of the functions of tracking its position, rotation, and orientation relative to the computing device 130 or an environment in which it is operating (e.g. a room or external sensors, cameras, or lights).

Figure 2:
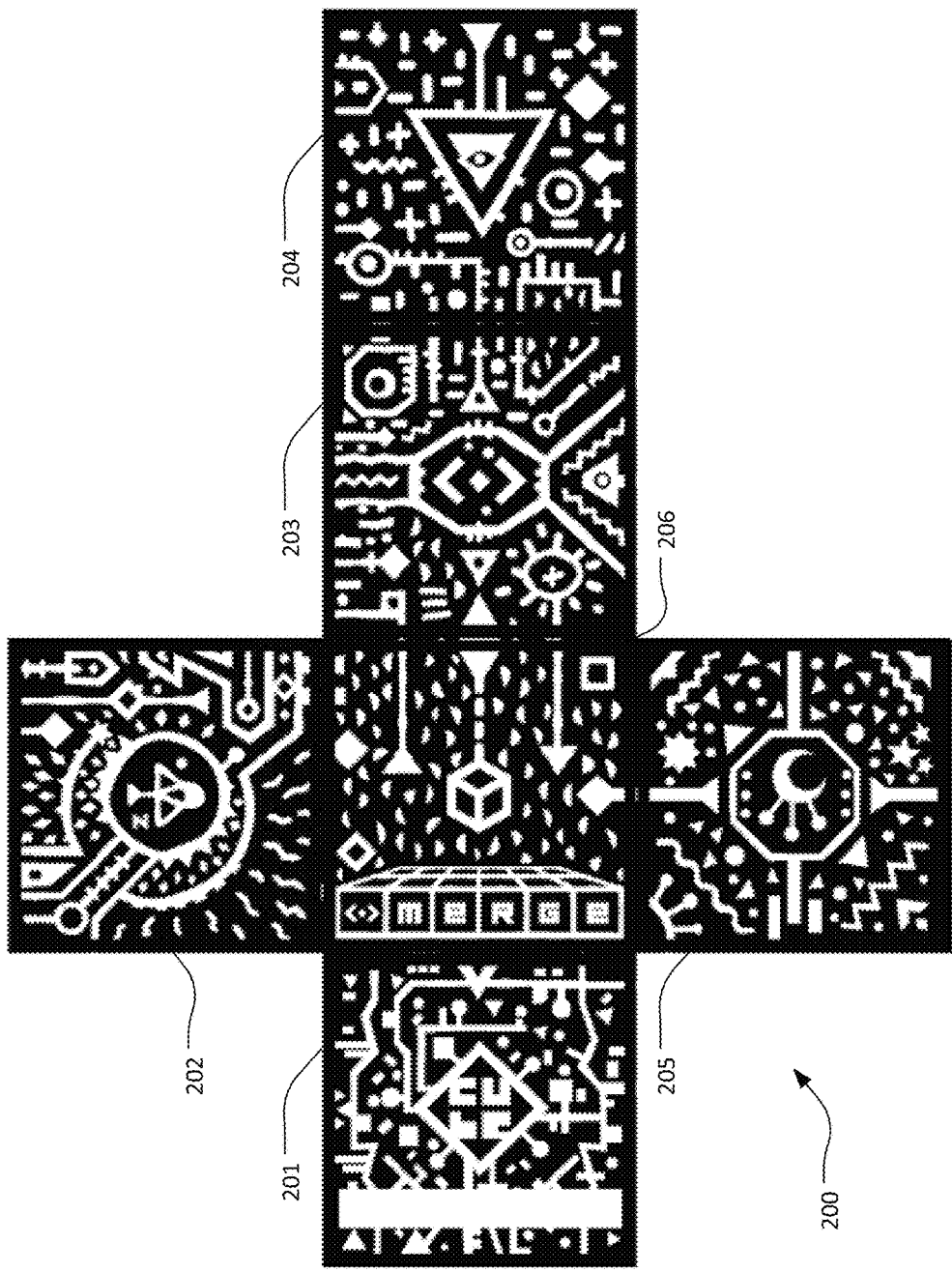
FIG. 2 is an example set of sides for a cube that may be used to interact with an augmented reality environment.

FIG. 2 is an example set of sides for a cube 200 that may be used to interact with an augmented reality environment. FIG. 2 is merely an example of a potential cube 200. As discussed above, other shapes may be used, and virtually any type of computer-recognizable images may be used on each face. Or, as discussed above, lighting colors, depth sculpting on each face (for detection by depth-sensing systems), lighting formations (e.g. lighting in particular shapes or designs), and other detection techniques may be employed.

The cube 200 includes six faces 201, 202, 203, 204, 205 and 206. To enable computer vision algorithms to function at different depths (e.g. close to the camera—within a few inches; arm's length—within 20-40 inches; and at greater distances—within a few feet), the images selected have a few specific characteristics. The cube is shown with its faces exploded for purposes of pointing to the characteristics of the cube 200. When formed, the cube 200 will be cubical and, preferably, made from a relatively sturdy, compressible material. Preferred materials include foams, polymers, metals, and similarly strong and resilient materials. In the cases, discussed below, where electronic components are incorporated into the cube 200, it may be made of injection molded plastic, foam or other materials, so long as they are capable of wear and protecting those components during normal use.

First, the images have relatively large-scale components that are easily distinguishable at a distance from the camera (e.g. arm's length or further). For face 201, this shape is a diamond (or square, depending on how held) and an associated large white bar. In some cases, the bar may include copyright information or other information related to the cube. In the case of face 202, this large-scale shape is a central circle, surrounded by another central partial-circle. For face 203, this shape is an oblong oval shape, connected to a pyramid-top on the "right" side. For face 204, the shape is a large triangle with a white triangle in its middle. For face 205, the shape is an octagon with two lines passing through it or nearly-through it. Finally, for face 206, the large-scale shape is a three-sided view of a cube and a series of lines from the "top" of that face. It should be noted that the trademarks MERGE® and <•>® appear in faces 203 and 206.

These large-scale shapes are easy for computer vision techniques to (1) detect and (2) to differentiate from one another at approximately arm's length (20-40 inches). This is important because the three-dimensional object (e.g. cube 200) is generally intended for use at approximately arm's length when held in a user's hand. However, at times, a user may also move the device much closer. When held at arm's length, the intricate details of each face 201-206 may be difficult to detect. So, the large-scale images are included on each face so that computer vision techniques may use them for detection at those distances and still operate as-desired. Also, when held at close range, the details enable the computer vision to detect fine movements and to maintain stability of the image's correspondence in the virtual environment when the actual three-dimensional object is substituted in the virtual or augmented reality world for a virtual object.

However, the cube 200 also includes close-up elements for use in detection by computer vision techniques at a closer depth. When the cube 200 is held much closer to the associated, detecting camera may not even be able to see the entirety of the large-scale images on each face and, without more, may be unable to determine which face is visible. For these cases, smaller lines and shapes are interspersed on each face of the cube 200. These may be seen in each face 201-206. And, as may be noticed, the small lines and shapes are intentionally relatively distinct from face to face. For example, squiggly lines are almost exclusively present in face 202, where "plus sign" shapes are exclusively present in face 204. Triangles are only present in face 205 and half-moon shapes are almost exclusively present in face 206. Face 203 has the most diversity, but remains readily distinguishable from the other faces, even at close range to computer vision algorithms—particularly when those algorithm's search is limited to matching to only one of six possible faces which may be being presented to a camera at a time. The smaller lines and shapes on each face 201-206 are presented in a variety of different rotational orientations on the respective face to facilitate quicker recognition of those lines and shapes at a variety of different viewing angles and viewing distances.

As a result, at least two detection distances are capable of detection by relatively low-resolution cameras in multiple, common lighting situations (e.g. dark, light) at virtually any angle. This technique of including at least two (or more) sizes of fiducial markers for use at different detection depths, overlaid one upon another in the same fiducial marker, is referred-to herein as a "multi-layered fiducial marker." The use of multiple multi-layered fiducial markers makes interaction with the cube 200 (and other objects incorporating similar multi-layered fiducial markers) in augmented reality environments robust to occlusion (e.g. by a holder's hand or fingers), rapid movement, and provides strong tracking through complex interactions with the cube 200. In particular, high-quality rotational and positional tracking at multiple depths (e.g. extremely close to a viewing device and at arm's length or across a room on a table) is possible through the use of multi-layered fiducial markers.

The presence of stability from close to a camera and distant from a camera is unique to the use of this multi-layered fiducial marker and is noticeably different from markers employing only a single detection depth or layer. As a user moves a single-layer fiducial marker object away from a viewing camera, the viewing object (e.g. camera on a computing device) has an increasingly difficult time detecting the orientation and position of the object. Or, if the object is designed for distant viewing, as it is moved closer to the camera, its orientation and position become increasingly difficult to track. As a result, and in either case, the object appears to move, flutter, or becomes untrackable. But, using a multi-layered fiducial marker, tracking and stability of the resulting replacement augmented reality or virtual reality object within the virtual or augmented reality world can be maintained with the object held at multiple distances from a camera.

Generating these multi-layered fiducial markers on multiple faces of a three-dimensional object in such a way that they are uniform across the object has actually proven difficult in the art. Traditionally, fiducial markers have been symbols such as QR codes on a single face or on a single object. These fiducial markers are often printed on stickers or sheets of paper and hand-placed on objects—again, typically a single face. However, alignment of each of the fiducial markers on each face is important for precise tracking (at multiple depths) and across faces as an object is rotated. If faces are poorly-aligned (e.g. aligned in ways different from the alignment expected by the computer vision algorithm in a "perfect" three-dimensional representation of the object, then tracking and stability of the augmented reality object in the virtual three-dimensional scene degrades substantially. Objects may be seen to skip about in a few different, nearby locations, and floating of the object may appear unnatural or to levitate over one's hand (for example) when on one or more faces that are poorly aligned.

As a result, the multi-layered fiducial markers of the cube 200 here may be created not through stickers or paste-on images. Instead, they can be created using injection molding of the entire object. Preferably, the "light" areas of the cube 200 are raised by approximately 2-5 millimeters from the "dark" areas of each face. This is accomplished by using injection molding wherein the raised areas, which may be dyed the lighter color or painted the lighter color or made lighter through other methods, are precisely aligned in the molding process. In this way, each of the resulting cubes 200 are identical. Subsequent computer models may be based upon one of these injection-molded cubes. This is much better than the use of applied stickers, direct painting on a flat surface and other techniques because it makes the fiducial markers uniform for every cube. Thus, the computer model of each cube 200 is also uniform and image stability for the object replacing the cube within a given virtual reality or augmented reality scene is likewise uniform and without jitter present for non-injection molded three-dimensional objects.

In a typical case either a single face 201-206 is presented full-on to a camera (and its associated image to a computing device for face identification) or a cube is held in such a way that multiple faces are visible to a camera. If the former, it is quite easy to detect which face is facing the camera because it is fully-visible to the camera. In the latter case, the orientation of the most front-facing face typically may be ascertained, and that information may be used in conjunction with partial views of the partially-visible sides to quickly make a very good determination which faces 201-206 are visible and their orientation.

The surface coloring of white and black or a reflective color and black are purposefully chosen because the strong contrasts is easiest for computer vision techniques to detect and quickly match and categorize the faces 201-206. If patterns like those of cube 200 are used, the surfaces of the cube 200 (or some surfaces—e.g. the white surfaces) may be made reflective so that they are even further contrasted with the dark portions. Or, some or all of the cube 200 may be coated in anti-reflective coating or materials so that reflections or ambient lighting does not interfere with the computer vision and detection and tracking techniques. Bright, high-contrast colors such as fluorescent colors may be used as well. Ultraviolet (for use with UV lights and UV cameras) or glow-in-the-dark paints may be used with corresponding sensors.

All of the foregoing enables finely-grained positional, orientation, and rotational tracking of the cube 200 when viewed by computer vision techniques at multiple distances from a viewing camera. When held close, the object's specific position and orientation may be ascertained by computer vision techniques in many lighting situations, with various backgrounds, and through movement and rotation. When held at intermediate distances, due to the multi-level nature of the fiducial markers used, the object may still be tracked in position, orientation, through rotations and other movements. With a high level of tracking available, the cube 200 may be replaced within augmented reality scenes with other, rendered three-dimensional objects. Interactions with the cube 200 may be translated in the augmented reality environment (e.g. shown on an AR headset or mobile device) and, specifically, to the rendered object within the scene and for which the cube 200 is a real-world stand-in.

Although shown as a series of high-contrast, multi-layer fiducial markers other types of markers, such as active markers or inside-out tracking by the cube itself, or in conjunction with the computing device 130 may be used.

FIG. 3, made up of FIGS. 3A-3H, are a series of cubes 350a-350h, each including different elements that may be used for interactivity with an augmented reality environment.

Cube 350a in FIG. 3A includes button 352a. Button 352a is shown as quite large, protruding from the exterior of cube 350a. However, button 352a may be a small button, a capacitive button, or merely an activatable switch, under the surface of the exterior of the cube 350a. Button 352a may not be a "button" at all, but instead may be a pressure detection sensor or sensors on the interior of the cube 350a that enables the cube 350a to detect when pressure of certain magnitudes is applied to the exterior of the cube 350a. The sensor(s) may be of sufficient granularity that it may detect pressure particularly on a single side of the cube 350a. As a result, interaction with the cube 350a including that pressure may be detected by (with the functionality powered by) a relatively simple processor operating within the cube 350a. That information may be transmitted from the cube 350a to an associated computing device 130 (FIG. 1).

The computing device 130 may be programmed, based upon a particular application operating, to react in a particular fashion. For example, the button 352a press or pressure sensed may operate as a "click" in a user interface. Or, the button 352a press or pressure sensed may operate as a weapon firing or object operation (e.g. door opening) within a game or other three-dimensional environment. The data may be communicated wirelessly (e.g. Bluetooth or over WiFi or RFID) between the cube 350a and an associated computing device 130 (FIG. 1).

There may be multiple buttons 352a, one or more on each face, or a series of pressure sensors accessible to the exterior of the cube 350a or within the interior of the cube 350a. Each button or pressure sensed may be associated with a particular face of the cube 350a. In this way, the interaction with a particular face through the button 352a press, or pressure sensed, may be associated with a particular interaction. Pressing on one face may enable a paintbrush tool (or a secondary interface for interacting with a tool selector), while interaction with other faces may operate to select different colors or paintbrush sizes. As discussed more fully below, translation and rotation of the cube itself may alternate between colors, or paintbrushes or, in other contexts, between other options within a user interface.

The button 352a may not be a button at all, but instead may be computer vision detecting the status of the face of the cube 350a. If the face is sufficiently distorted through the application of pressure, that distortion may be detected by computer vision algorithms as meeting a certain compression or distortion threshold and, as a result, a button "press" may be registered by computer vision operating on a computing device 130 (FIG. 1) without the need for any actual button within the cube 350a and, perhaps more importantly, without any electronics, battery power, or processing power incorporated into the cube 350a itself. This "button" press may operate fully on the computing device 130 while providing functionality much like that discussed above with regard to an actual, physical button or pressure sensor. Due to the details visible and not-visible on the face of the cube, computer vision techniques may even be able to localize the position of the compression on the cube face to a particular quadrant or portion of the cube. Thus, an interactive interface for each face of the cube may be created and used in the virtual or augmented reality environment without reliance upon physical buttons at all.

Cube 350b in FIG. 3B includes a light 352b and, potentially, several other lights (not labelled). The light 352b may be used for simple actions such as object tracking for computer vision applications to detect the location or orientation of the cube 350b in space in front of a camera. Then, three-dimensional virtual objects may be rendered that replace the actual, physical cube 350b in an augmented reality scene. However, multiple lights, each of a different color, may be employed so as to identify particular sides or faces or edges of the associated cube 350b. As discussed above, and discussed more fully below, an easily-determinable identification of a particular face, not just the presence of an object is useful in enabling the cube 350b to operate in conjunction with a computing device 130 (FIG. 1) to operate as a physical object that can be used to interact with a user interface presented on the display 138 of the computing device 130.

The light 352b is shown as a single light, centrally-located on a particular face. However, the light 352b may in fact be several lights, in a particular pattern around a face. Or, the light 352b may be presented to a camera 137 in a particular form through the use of selective transparency on the face of the cube 350b or through the use of light guides. The presentation of a particular pattern, like the patterns shown in FIG. 2, may enable detection of a particular face for the cube 350b but also detection of an orientation and overall position and relative location of the cube 350b when held or placed on a table or near the computing device 130. This enables fine-grained control through translation and rotation of the cube 350b such that even small movement or rotation of the cube can be detected by computer vision techniques. Different lighting patterns or colors may be employed on each face (or both) to enable tracking and rotational detection for the interactions described herein.

The light 352b may also be dynamic such that the cube 350b incorporates a light level detector or camera to detect the light level in the room. The light 352b may react to the level of lighting in the room so that if it is very bright, the brightness of the light increases to compensate, but if the room is very dark, the brightness decreases.

Alternatively, the camera of the cube 350b or a viewing computing device 130 (FIG. 1) may detect that the background behind the cube 350b incorporates a particular color that makes it harder for the computing device to perform computer vision operations to detect the cube 350b. In response, the cube 350b may be instructed to alter the light 352b color or colors to better stand out against that background (e.g. if the background is black and white, the cube 350b may be instructed to shift to an orange and blue color palate for the lighting because orange is easier to detect against that background. If the background is detected to be very "busy", the cube 350b may be instructed to cause the light 352b to select a uniform, simple pattern (e.g. checkers). If the background detected is very plain (e.g one, solid color like white), the cube 350b may be instructed to present a pattern that is more complex, and that does not rely upon white at all. A multi-color LED light array may be used for this purpose and may be paired with simple processing elements within the cube 350b operating under its own instruction or instructions from an external computing device 130 (FIG. 1).

Cube 350c in FIG. 3C includes a touch interface 352c. The touch interface 352c may be a capacitive touch sensor or plate, a resistive touch sensor or plate, or some other type of touch interface. The touch interface 352c may be a single point (e.g. capable of detecting whether a touch is occurring) or may be a surface area with sufficient granularity to detect where on a surface (e.g. an entire face of the cube 350c) a touch is or touches are occurring. The touch interface 352c may be so-called" multi-touch, capable of detecting multiple simultaneous touch interactions. The touch interface 352c may be able to differentiate between a "hard" touch including more pressure than a "light" touch including less. The touch interface 352c may cover the entire surface of one or more faces of the cube 350c. The touch interface 352c is shown as only covering a portion of one face of the cube 350c, but there may be touch interfaces on each of the faces, on a subset of faces, or only on one face. The touch interface 352c may be powered by a battery and associated processor within the cube 350c.

The touch interface 352c may support interactions with faces of the cube 350c such as swipes, multi-finger swipes, mouse-like interactions, click-like interactions, or more-complex gestures along one or more surfaces of the cube 350c. For example, particular actions using the touch interface 352c may include one or more gestures performed on difference faces of the cube 350c. For example, two fingers, each swiping in different directions, with each finger on a different face of the cube may instruct an associated computing device to perform one action, whereas swiping on two other faces may instruct an associated computing device to perform a different action. One set of swipes or multi-swipes or multi-clicks on two faces may switch between levels of zoom, while the same action on two different faces may select some aspect of a user interface. Actions as simple as a single touch or simultaneous touch on multiple faces may perform one action, while simultaneous touch on other faces may perform another.

For example, simultaneous touch (or simultaneous touch of sufficient detected force) on two faces opposite one another may act as a "grab" action within a three-dimensional environment to select, and "grab" onto a virtual or augmented reality object so that it may be moved or interacted with. To a user of the cube 350c, this action would "feel" a great deal like grabbing an object, for example, a broom handle, or gun handle, or sword, or remote control within an augmented reality environment. During interaction with the augmented reality environment, the user may be required to maintain the opposed touches so as to maintain a "grip" on the selected or picked up object while interacting within the augmented reality environment. Holding a sword or gun within a game, for example, may require touches on all four faces making up one circumference of a cube (or three faces) in much the same way one might "hold" such a weapon in reality. Letting go of one or two of the four faces may cause the virtual weapon to drop from one's hand. Or, releasing one's grip to a sufficient degree—detected by the force sensors—may release a weapon, despite a "touch" being registered on all four faces or all three faces.

Cube 350d in FIG. 3D includes a haptic element 352d. The haptic element 352d may be an electric motor, including a small weight, surrounded by a coil that enables it to "vibrate" when electricity is passed through the coil so as to cause the weight within to rotate about the motor or a central axle. There are similarly linear acceleration haptic motors that intermittently charge a weight along an axis to simulate "hits" or resistance with more of a "strike" feel than a "rumble" feel. The iPhone® 6s was the first large-scale commercially-available device that incorporated a linear acceleration haptic motor in the form of its "taptic" engine. Multiple haptic elements 352d may be used for different "feels" to be emulated by the cube 350d. These are only two examples.

The haptic element 352d may operate in conjunction with an augmented reality environment generated and shown on a computing device that views the cube 350d and replaces it with some augmented reality object to better-emulate that object. For example, if a beating heart visually replaces the cube 350d on the display of a computing device viewing the cube, then the haptic element 352*d* may generate soft "strikes" or throbbing or vibration to emulate the associated heartbeat. The rhythm may be matched to that displayed on the display to a viewer's eyes. In such a way, the immersion of the associated human heart may be increased. Not only is a human heart being displayed in place of a cube 350*d* being held by a viewer, but the cube can be felt "beating" in that user's hand. Firing a gun or striking someone with a sword may be felt as "strikes" generated by the haptic element 352*d*. A purring virtual "pet" may be felt as vibration (e.g. a virtual cat purring) generated by the haptic element 352*d*. Again, this may correspond to visual data (e.g. the cat purring) presented on a display of the associated computing device viewing the cube 350'"

Similarly, multiple virtual "objects" within the cube may be emulated through appropriate use of the haptic element 352*d*. For example, multi-sided mazes have been around for many years. These mazes typically incorporate steel balls that move along wooden corridors within the maze and which a user must navigate appropriately by turning the entire maze a particular orientation and with particular timing as the ball moves, or the maze must be restarted (e.g. the ball falls through to a restart point). Such a virtual maze may be substituted for the cube 350*d* visually on a computing device display in an augmented reality environment. As the steel ball moves through the maze, appropriate haptics (e.g. hitting a wall, dropping through a hole, or weight distribution) may be emulated. In this way a particular part of the maze may feel heavier (holding the ball) or may feel as though it were "bumped" as the ball strikes a side or otherwise moves throughout the maze. These and similar haptic actions may take place for the cube 350*d*.

Cube 350*e* in FIG. 3E includes speaker 352*e*. The speaker 352*e* may be multiple speakers, one or more for each face, or may be a single speaker 352*e*. The speaker may be powered by battery in the cube 350*e*. The speaker 352*e* may perform actions as simple as playing music or sounds as directed by a user of an associated computing device.

However, sound may be synchronized with things taking place on the display of an associated computing device that are associated with the cube 350*e*. For example, if the cube 350*e* is replaced by an augmented reality kitten, the cube may play "meow" sounds, "purring" or other actions that kittens make that create sound. So, as a viewer sees the augmented reality or virtual kitten meowing, the sound may come from the cube itself, rather than from the mobile device, VR/AR headset or a computer speaker nearby. Virtually any type of sound created by anything that the cube is "replaced by" in the augmented realty environment may have associated sounds, noises, music, or the like. The speaker 352*e* on the cube 350*e* may make those sounds, noises or music. This, again, further increases immersion.

Cube 350*f* in FIG. 3F includes a temperature element 352*f*. The temperature element 352*f* may be a device that is capable of increasing or decreasing its exterior temperature, typically through the use of low electric voltage, so as to emulate the augmented reality or virtual reality object being shown on the display of an associated computing device. For example, if the cube 350*f* is replaced with an ice cube in the display, it would feel unusual to have that ice cube be room temperature. It would be more appropriate for that cube 350*f* to feel cold to the touch. The temperature element 352*f* may, therefore, adjust its temperature accordingly. Even if the temperature element 352*f* is incapable of reaching an actual freezing temperature, as an ice cube would have, even lowering the temperature appreciably would increase the immersiveness of the experience of holding a virtual reality or augmented reality ice cube. Fine grained control may or may not be possible, particularly at low voltages, but are not required to increase immersiveness.

Similarly, if a player or person is playing as a "wizard" within an augmented reality or virtual reality game and begins a "fire" spell to cast at one's enemies, the cube may substitute on one's hand for a fireball or a source of the associated fire spell. In that context, the feeling of warmth on one's palm or fingers emanating from the cube would increase the immersive experience of that user as the fire spell is begun or initiated. A multi-touch or multi-faced action involving the touch interface 352*c* may initiate the fire spell and the heating of the cube 350*f* (as instructed by software on the associated computing device interacting with software and the temperature element 352*f*).

These and many other applications of the temperature element 352*f* to cause the temperature of the cube 350*f* to better-correspond to the visual imagery being shown on the display of a viewing computing device in place of the cube 350*f* will cause the overall augmented reality experience of the cube 350*f* to be better for a user, particularly one holding the cube in their hand.

Cube 350*g* in FIG. 3G includes bladder 352*g*. The bladder 352*g* may be one bladder, or multiple bladders or may not actually be a bladder, but may be a series (e.g. one for each fact or four or five for each face) of electrically-retractable and extendable elements. Similarly, one bladder or multiple bladders may be used on each face of the cube 350*g*. Although described as a bladder, electromagnetic actuators, levers, electronic pistons, and other, similar, systems may also be used.

The bladder 352*g* may be controlled by electronics on the cube 350*g* in concert with instructions from the computing device to either fill or empty the bladders (or to extend or contract the electronic elements) to cause the cube 350*g* to deform. This deformation may be controlled by the computing device to better-correspond to the shape of the object being displayed on the computing device.

For example, as a virtual or augmented reality pistol is held by a user in the augmented reality environment with the real world cube 350*g* as the pistol grip, the cube 350*g* may be deformed by evacuating two bladders on opposite faces and by inflating those on adjacent, also opposite faces, to cause the cube to take on an elongated, thinner shape more-like a pistol grip.

Alternatively, if a virtual or augmented reality heart is displayed on the computing device display, a series of 6 bladders 352*g*, one for each face, may all be inflated to cause the cube to be more round. As a result, the cube 350*g* feels more like a heart and less like a cube. As discussed above, haptic element 352*d* may simultaneously generate heart "beats" that are felt in the more round cube 350*g* to increase the overall similarities of the virtual and actual experience.

Cube 350*h* in FIG. 3H includes electrode 352*h*. This electrode 352*h* is labeled as though it is a single electrode, but it may in fact, be a series or a multiplicity of electrodes or similar electric elements on each face of the cube 350*h* or with multiple electrodes on each face of the cube 350*h*. Research into particular voltages applied to electrodes particularly to small electrodes, has indicated that at certain voltages, applied directly to the skin, the nerve endings associated with touch, pressure, heat, or pain can be stimulated in such a way to emulate very similar experiences by causing the desired nerves to react, without actually causing the desired feeling (e.g. touch, pressure, heat, pain, etc.).

So, small electrical currents may be passed through a user's hand or to the skin of a user's hand, while holding the cube 352h to simulate a particular "feel" of the cube 350h through only the use of a small current. This current may simulate texture (e.g. fur, spikes, cold stone or metal, and the like) through the application of an appropriate voltage. Thus, the electrode 352h (or multiple electrodes) may be used to emulate a broad array of experiences for a holder of the cube 350h.

Though each of the cubes 350a-350h are discussed in turn, any of the various elements discussed may be combined with one another in a single cube 350. So, haptic element 352d may be combined with touch interface 352c and/or may be combined with electrode 352h and so on. Each of the elements were discussed individually so as to inform as to their intended uses, but combination uses may also be made. Likewise, each of the elements can be provided on one or up to all six faces of the cube, or in a combination such as touch interface 352c and light 352b on each face, or any other permutation. Each of these options available for application by the cube to interact with a holder of a cube 350, may be described as "dynamics." Dynamics, as used herein, is similar to haptics, but is intentionally a broader term incorporating the use of one or more of the elements 352a-352h discussed above to create an overall dynamic experience to a holder of a cube 350. As such, the various elements 352a-352h may be termed "dynamic elements."

For example, while gripping a cube 350 as detected by the touch interface 352c and using an augmented reality sword to strike virtual enemies, the haptic element 352d may react with an appropriate "thud" or "impact" feeling in response to each strike. This may further engage immersion of one wielding the "virtual" weapon. Similarly, audio feedback associated with a gun firing may be generated by speaker 350"" every time button 352a is pressed (or pressure is sensed) to better-emulate a gun firing. The temperature element 352f may heat up as a gun is rapidly fired for a time to feel more like a real gun heating up in response to rapid firing. Likewise, bladder 352g may alter the shape of the cube 350 to better-feel like the handle of a pistol. Though these examples are made with reference to a weapon-based game, virtually any other options are available, so long as the associated elements are capable of emulating or somewhat emulating a particular augmented reality object through clever utilization of one or more elements.

Communication between a computing device and the cube 350 may take place using Bluetooth®, WiFi, near field, RFID, infrared or any other communication protocol that is appropriate given the bandwidth and power-consumption requirements. Low-power alternatives will typically be preferred so as to conserve power for any of the elements to actually perform the functions discussed.

Description of Processes

Figure 4:
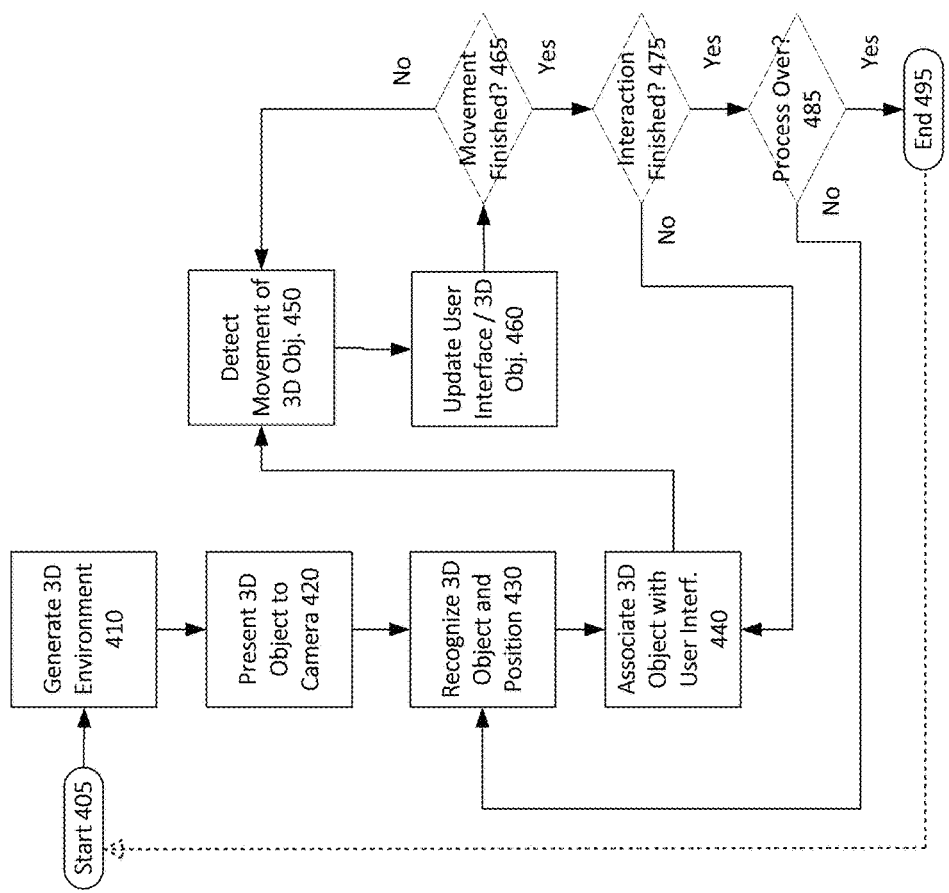
FIG. 4 is a flowchart for a process for interacting with an augmented reality environment.

Referring now to FIG. 4, a flowchart for a process for interacting with an augmented reality environment is shown. The flow chart has both a start 405 and an end 495, but the process is cyclical in nature, as indicated by the dashed return arrow. The process may take place many times while a computing device is viewing and tracking a cube or other three-dimensional object.

Following the start 405, the process begins with the generation of a three-dimensional environment at 410. This environment is generated on the display of a computing device. The three-dimensional environment may entirely replace reality (e.g. a virtual reality environment) or may supplement reality with "augmentations" (e.g. augmented reality) or may only incorporate one or more particular elements. This replacement and/or supplementation takes the form of a three-dimensionally-rendered environment or objects within the environment. So, for example, a user in virtual reality may suddenly appear, visually, to be present on the Temple Mount in Jerusalem or along the shore of Lake Como in Italy or in a completely fictional location within an immersive game, a story-based environment, or other location.

A user in augmented reality typically remains present in their current location with a camera built-into an augmented reality headset or device (e.g. a mobile phone) acting as a "window" into the augmented reality world. Within the augmented reality word, the user may see primarily his or her current location, but additional objects, persons, or other elements may be added. So, one may be sitting in his or her office, but when looking through the augmented reality computing device, a fairy may be floating near a wall within the office or a narrator may be standing in a nearby hallway narrating to the user of the augmented reality device.

Augmented reality typically tries to merge the real and un-real to appear as normal as possible, but more cartoonlike or game-like experiences are also possible. To this end, more-advanced augmented and virtual reality systems rely upon lidar, infrared cameras and scanners, and other, similar technology, to physically map the three-dimensional characteristics of the present environment. In this way, the precise size and shape of a room may be ascertained and any augmented reality objects, people, or other elements may be integrated more accurately. For example, images may replace actual walls without "turning corners" or appearing to hang in mid-air. People can be properly presented when behind furniture so that perspective does not appear to have been violated. These and other capabilities are possible, depending on the robustness of the associated computing device that is rendering the three-dimensional environment.

In this context, most augmented reality or virtual reality environments in the present state of the art have relied primarily, if not exclusively, upon visuals. Some more sophisticated systems also incorporate controllers that are capable of being tracked, either by the headset itself or by external trackers. In this way, systems like the PSVR® for example, can track controllers held in the hands of users. Those controllers have buttons on them that enable some basic interactivity. However, the tracking for PSVR® systems, for example, follows light emitted by a single spherical ball of a unique color (so multiple balls may be tracked simultaneously). Each "ball" does not have a side, and up or a down, precisely because they are round. Their location, but not orientation, may be tracked.

Similarly, the Oculus® Touch® controllers incorporate buttons and an exterior, circular loop surrounding the hands of a holder that emits infrared light that may be tracked. In this way, a holder's hand positions, and orientations may be tracked. However, the functionality for that tracking requires an external (or several) cameras to track the motion of those hand-held controllers.

In contrast, the next step of using the cube described herein is to present the cube (or other three-dimensional object) to the camera 420 of the computing device. In the most common case, this camera will be the camera on a mobile device (e.g. an iPhone®) that is being used as a "portal" through which to experience the augmented reality environment. The camera has none of the accoutrements of complex systems like the Oculus® Touch®. Instead, it is merely a device that most individuals already have in their possession and that includes no specialized hardware for detection of particular infrared markers or other specialized elements.

Likewise, though the three-dimensional object is described above as capable of incorporating a multiplicity of elements that may augment an immersive experience, it may, instead, be as simple as a cube with six unique fiducial markers. Objects with as few as two or three unique fiducial markers may suffice. As used herein, the phrase "unique fiducial marker" expressly does not include multiple single lights, infrared or otherwise, used as a set as a fiducial marker. In the understanding of this patent, an entire controller, such as the Oculus® Touch® that utilizes a series of lights is, effectively, one fiducial marker. Without several lights in known positions (and typically many more) computer vision techniques could not know position, orientation, or relative location of the Oculus® Touch® controller. Thus, a single light on the Oculus® Touch® is not a fiducial marker at all—it is a light. Multiple lights, together, make up a single unique fiducial marker as that phrase is used in this patent.

Discussed another way, the phrase "unique fiducial marker" means an individual marker, complete in itself, that can be used to distinguish one face or one entire edge (not a single point) of a controller or three-dimensional object from another face or edge. In addition, a unique fiducial marker may be used, in itself, to determine the position of the object bearing the fiducial marker. As seen in this application, one way of doing that is to create a six-sided cube with each side bearing a unique fiducial marker. The Oculus® Touch® and other, similar, AR and VR controllers rely upon a known configuration for infrared lights on the controller. While accurate, each of these lights alone is not "complete in itself" in that a single light is insufficient to distinguish one face or one edge of an Oculus® Touch® controller from another. In a group, collectively, they may be used to derive orientation and position information, but even only two of the lights, alone, do not define any face or edge.

The use of unique faces, each including a unique fiducial marker is uniquely important because it lowers the overall investment necessary to experience immersive virtual or augmented reality incorporating a "controller" and enables additional functions not available without the expense of more-complex VR and AR headsets or systems and controllers.

Though discussed herein as a multi-layered, unique fiducial marker that is in the form of a black and white, high-contrast image on the face of the three-dimensional object; in some cases, other computer detection techniques may be used for some aspects of the positional, rotational, and orientational tracking of the three-dimensional object. For example, unique fiducial markers may be edge or corner detection techniques such as each edge or corner of a three-dimensional object bearing a unique color or colors. A combination of a specific set of unique colors, one on each corner, may be used to determine a specific face associated with those edges, and to determine the orientation (e.g. the orange corner is bottom right of the cube, and the purple corner is top left, therefore the cube is in this orientation and at this distance based upon the sizes of the corner colors detected).

Likewise, the colors or markers may be passive or active, including paint, reflective materials and the like or reliant upon lights or interior lights that escape from the surface of the three-dimensional object only in certain orientations and/or patterns and/or colors. For example, the unique, multi-layered fiducial markers may be only white and black, but the white may be generated by lights passing through the exterior of the three-dimensional object. Alternatively or in addition, the lights may be color coded such that each face is a unique colored light, but the pattern may be the same on each face or corner. Alternatively, the pattern may be different on each face or corner, but the colors may be the same.

Similarly, other techniques may be used, at least in part, for detection of the position, orientation, and rotation of the three-dimensional object. Those include outside in tracking for the three-dimensional object (e.g. the object includes cameras or marker detectors for tracking its own position and associated communication capabilities with external devices), light-based detection, the use of multiple, exterior cameras to detect more than one or a few sides simultaneously. Motion and rotational and gravitational sensors may be included in the three-dimensional object itself to track or to enhance tracking of the three-dimensional object.

Next, the three-dimensional object is recognized by the camera of the computing device at 430 while the position, orientation, and motion begin being tracked. At this stage, not only is the three-dimensional object recognized as something to be tracked, but the particular side, face, or fiducial marker (and its orientation, up or down or left or right) is recognized by the computing device. The orientation is important because the associated software also knows, if a user rotates this object in one direction, which face will be in the process of being presented to the camera of the computing device next and can cause the associated virtual or augmented reality rendered object to react accordingly. At 430, the tracking, position, orientation and motion (including rotation) begin being tracked by the software in conjunction with the camera. As discussed above, the camera may be used to perform this tracking, but the object may self-track and report its position, orientation, and motion to an associated computing device. Or, alternatively, the object and computing device may both perform some or all of the processes involved in tracking.

Now, the three-dimensional object (e.g. cube) may be associated with some aspect of the user interface of the augmented realty or virtual reality environment being shown on the display. This association may be as simple as "you" (the user of the computing device) are the three-dimensional object within a virtual or augmented reality environment being shown on the computing device. Or, the three-dimensional object may be a stand-in for a weapon, a gun, a ball, a map, a compass, or other type of object. Or, the three-dimensional object may be associated with a particular menu, operation, volume change setting, the user's "view" or perspective of the augmented reality environment, a page of a virtual or augmented reality book, and other similar aspects of a virtual or augmented reality environment or object.

That association may take place automatically. For example, a user may load a particular game, application, or experience. Upon load, the game, application, or experience may begin using the camera of the computing device. The game, application, or experience may be expecting to see the cube or other three-dimensional object. So, it may continually scan for objects within the frame of the camera that could be the expected three-dimensional object. Once found, the software may automatically associate the three-dimensional object with a particular aspect of the user interface.

For example, the object may become a star fighter, floating in space, and movement of that object may cause the star fighter to move in a similar fashion, mirroring the actions of the user on the object. Rolling the object forward may cause the star fighter to flight downward or may increase speed. Rolling the object backward may cause the star fighter to ascend or to slow down.

In other cases, the association may be manually-selected (e.g. through interaction with a menu on the display of the computing device) or may be enabled through interaction with the three-dimensional object itself. For example, clicking, squeezing, or moving the object in a particular fashion (e.g. to spell a "Z" in the air) may cause the object to take control over a "zoom" function within the interface or to take control over the audio volume of the associated application, or to select a paintbrush within an application. The actions and or movement may be previously-determined by the application itself or may be user-programmable. In this way, the object may act as a "mouse" or as some other interactive element for any number of applications. For example, a click, and a twist (rotation around a Y axis) may cause the object to act (and to visually appear in the display of the associated application) as a volume knob. As it is turned to the right, audio volume may increase. As it is turned to the left, volume may decrease, in much the same fashion as a typical volume knob, all the while the user is actually merely holding a cube with six-faces including different fiducial markers.

Once the three-dimensional object is associated with a particular user interface element at 440, movement of the object may be detected at 450. This movement may be in essentially any form. For example, translational movement may be "away from" a user (or the display or camera) or toward the user, in a rotation about an axis, in a rotation about multiple axes, to either side or up or down. The movement may be quick or may be slow (and that may be detected and may matter, depending on the function or augmented reality object associated with the three-dimensional object).

The movement may also be kinetic, such as when the object is thrown up in the air, between users, or at a target. Due to the capability of simple computer vision techniques to track the three-dimensional object at multiple depts. (e.g. the multi-layer fiducial markers), the object may be reliably tracked at distances close to a user before being thrown, and further from a user, after being thrown. Multiple three-dimensional objects may be used in some cases as part of games where throwing or passing objects is done.

Since generalized object tracking has existed for some time, the most relevant movement for purposes of this application are those that involve tracking of a particular face or faces of the three-dimensional object. Most commonly, that will be rotation about one or more axes. However, it may also be tracking which "face" is currently being compressed, clicked, or which face is being held in a particular user's hand (or where). For example, detecting that face x is visible, and assuming that the three-dimensional object is being held in a right hand, the face y may be most-likely to be held closest to the skin of a user's hand. That information may be used to provide dynamics to that face or closest to that face (e.g. heat, or a strike, or the like) when interactions with the object take place in the virtual or augmented reality environment.

The detected movement may be used to update the user interface and/or the three-dimensional object itself 460. In particular, the associate three-dimensional object with user interface 440 step may be used as a preliminary step to identify the aspect of the user interface, automatically or as a selective action, that will be the subject of the update of the user interface and/or three-dimensional object at 460. So, for example, a volume interaction may be selected at 440, in which case motion detected at 450 may be used to update the volume. Or, if a color selector is associated at 440 with the three-dimensional object, then rotation of the three-dimensional object detected at 450 may result in a color change (e.g. for a paint brush being used by a user and/or represented by the three-dimensional object within the augmented realty or virtual reality environment) for the paint being used. If the three-dimensional object is associated with an avatar or race car or space ship in a virtual reality or augmented reality game at 440, then the detected movement at 450, for example rotation forward, may cause that augmented reality or virtual reality object to increase in speed or decrease in speed or to jump or to perform other actions.

At decision step 465 a determination whether the particular movement is finished is made by the associated computing device tracking the movement of the three-dimensional physical object. This may be through a deselection or completed selection by the three-dimensional object through an action (e.g. click, or swipe or similar action) or may be through a timeout (e.g. 4 seconds elapse without change, then a particular action or user interface element is selected). If the particular movement is not finished ("no" at 465), then the process continues to detect the movement to 450."

If the particular movement is finished ("yes" at 465"), then the process continues to determine if the overall interaction is finished at decision step 475. Here, the application, game or other virtual or augmented reality environment operating as software on the computing device may check whether the overall process is complete. This may be simple, e.g. the game is over or the user is no longer navigating through the maze or the like. However, it may also be complex, such as a user has de-selected the paint brush tool within the paint-like application, but has not yet exited the application. If this is the case ("no" at 475), then the computing device may associate the three-dimensional object with some other aspect of the user interface at 440 and the process may begin again. For example, the user has de-selected the paintbrush, but has now selected the paint sprayer tool. The overall process is not complete, but the particular interaction being tracked initially has ended.

If the interaction has ended ("yes" at 475), then the computing device may determine whether the overall process is over at decision step 485. At this step, the software may simply be closed, or the mobile device or other computing device be put away. If so ("yes" at 485), then the process is complete at end point 495. If not, ("no" at 485), then the three-dimensional object may have been lost through being obscured to the camera, may have moved out of the field of view or may otherwise have been made unavailable. The process may continue with recognition of the object and its position at 430 and the process may continue from there.

Figure 5:
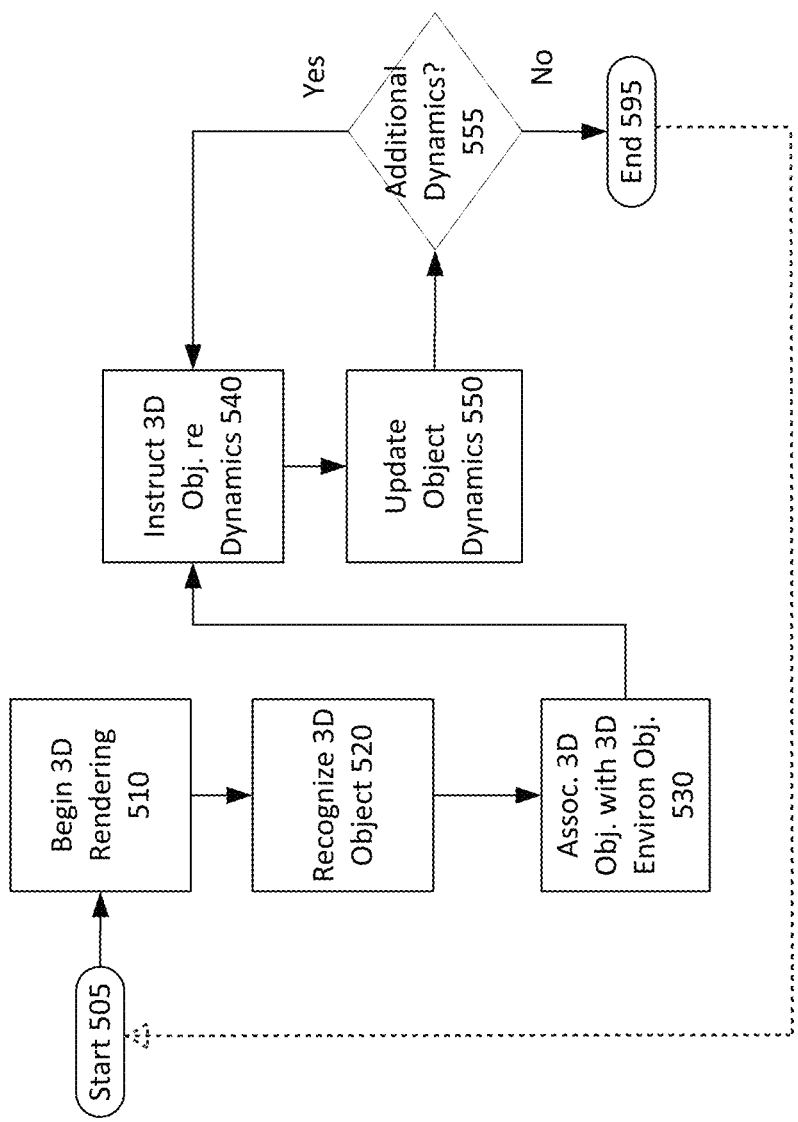
FIG. 5 is a flowchart for a process of updating dynamics of a three-dimensional object in response to changes in an augmented reality environment.

FIG. 5 is a flowchart for a process of updating dynamics of a three-dimensional object in response to changes in an augmented reality environment. The flow chart has both a start 505 and an end 595, but again the process is cyclical in nature as indicated. The process may take place many times while a computing device is viewing and tracking a cube or other three-dimensional object.

The process begins with rendering a three-dimensional environment (or object) such as a virtual reality or augmented reality environment at step 510. This is discussed above. The rendering device may be a computing device such as a VR/AR headset, a mobile device, a tablet or the like.

At step 520, the computing device may be presented with a three-dimensional object and may recognize it as such. As discussed above, the object may include one or more fiducial markers, lighting, or other aspects that enable it to be recognized. For the purposes of engendering dynamics to a three-dimensional object, that object need not necessarily have multiple fiducial markers, but it may.

The three-dimensional object may then be associated with a three-dimensional environmental object at step 530. So, within the virtual or augmented reality, the object may be associated, automatically, or through user action/selection, with an object. At this point, the actual, real three-dimensional object, being viewed on the display of the computing device, may be substituted on that display for an augmented reality or virtual reality object (e.g. a heart, a star fighter, a personal avatar, a gun, etc.) In an augmented reality environment, the rest of the reality would continue to be displayed normally, but the object (e.g. heart) would appear to be being held in the user's hand as opposed to the cube or other three-dimensional object.

The computing device may be in communication (e.g. via Bluetooth® or otherwise) with the three-dimensional object which incorporates one or more of the elements discussed with reference to FIG. 3, above, that are capable of generating dynamics. At 540, the augmented reality heart may begin "beating" on the display of the computing device. Simultaneously, the haptic element 352d may be instructed by the computing device to begin "beating" or operating so as to emulate beating of the heart that matches the rhythm of that being displayed on the display. Still further, the temperature element 352f may be instructed to raise the temperature of the three-dimensional object slightly to better-emulate a human heart. Finally, the bladder 352g may be instructed to inflate all bladders to feel more "round" so as to feel more like a human heart when held in the user's hand.

At 550, the dynamics of the three-dimensional object are updated as instructed at 540. As discussed above, virtually any combination of dynamics may be employed together to generate different sensations or feelings for a user, particularly a user holding the three-dimensional object.

If any additional dynamics are desired ("yes" at decision step 555) (e.g. the heart ceases beating in a dramatic fashion to demonstrate a cardiac arrest), then the instructions may be received from software operating on the computing device at 540 and the object dynamics may be updated again at 550.

If no further dynamics are to be updated ("no" at 555), then the process may end at 595 until the next iteration of object dynamics is desired.

Figure 6:
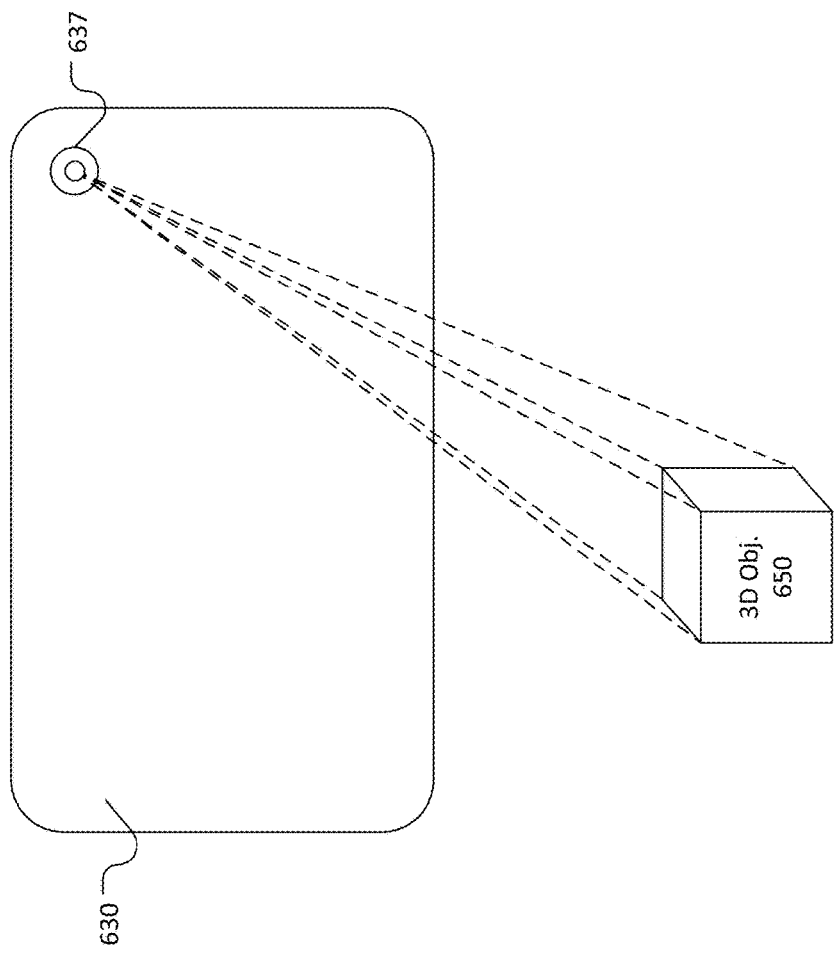
FIG. 6 is an example of a computing device engaged in computer vision detection and tracking of a three-dimensional object.

FIG. 6 is an example of a computing device 630 engaged in computer vision detection and tracking of a three-dimensional object 650. The computing device 630 is shown as the back of a mobile device or the front face of an augmented reality or virtual reality headset. The computing device 630 includes a camera 637 that is capturing images in front of the computing device 630.

One of those objects in front of the computing device 630 is the three-dimensional object 650. The three-dimensional object may be a six-sided cube including unique fiducial markers on each face so that its orientation, in addition to position, may be tracked by the camera 637.

Figure 7:
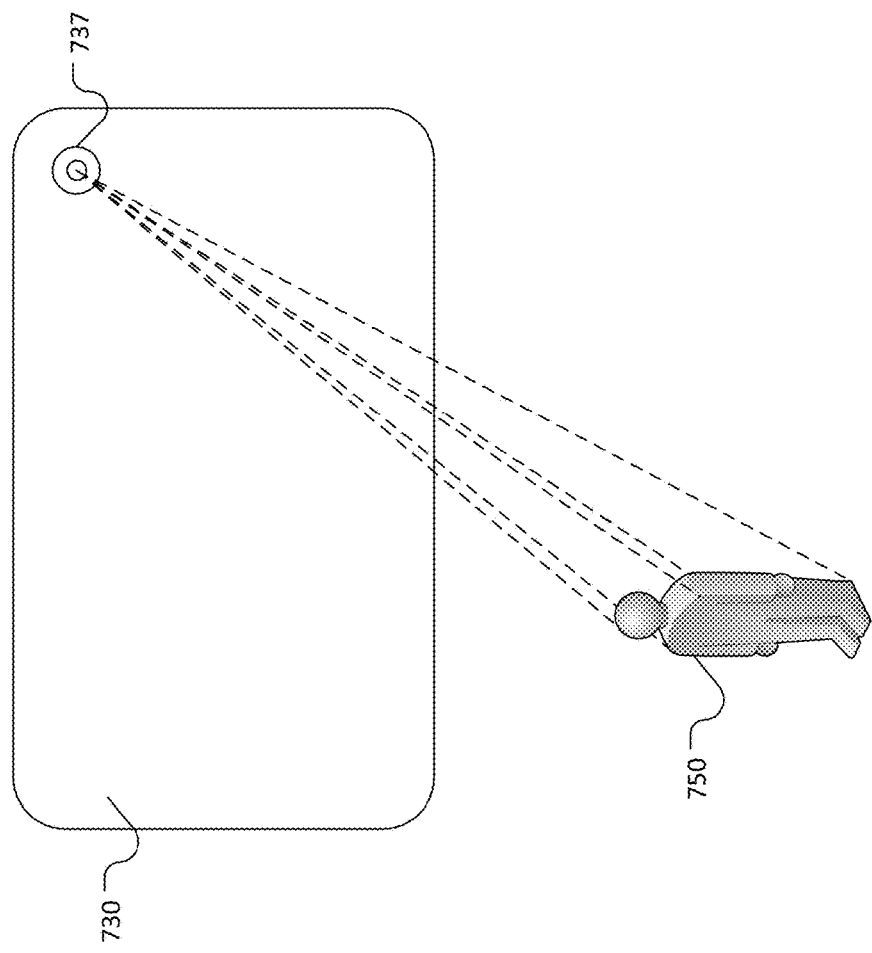
FIG. 7 is an example of a computing device substituting a detected three-dimensional object in an augmented reality environment for a rendered three-dimensional object.

FIG. 7 is an example of a computing device 730 substituting a detected three-dimensional object 650 (FIG. 6) in an augmented reality environment for a rendered three-dimensional object 750, such as a person. FIG. 7 is identical to FIG. 6 and the description of the associated elements will not be repeated here, except to point out that the computing device 730 is replacing the three-dimensional object 650 of FIG. 6 in a rendered environment with the rendered three-dimensional object 750. The rendered three-dimensional object 750 may be rendered in exactly the same position and orientation as the three-dimensional object 650. And, as discussed below, the rendered three-dimensional object 750 may move in the same way as the three-dimensional object 650 is moved.

Figure 8:
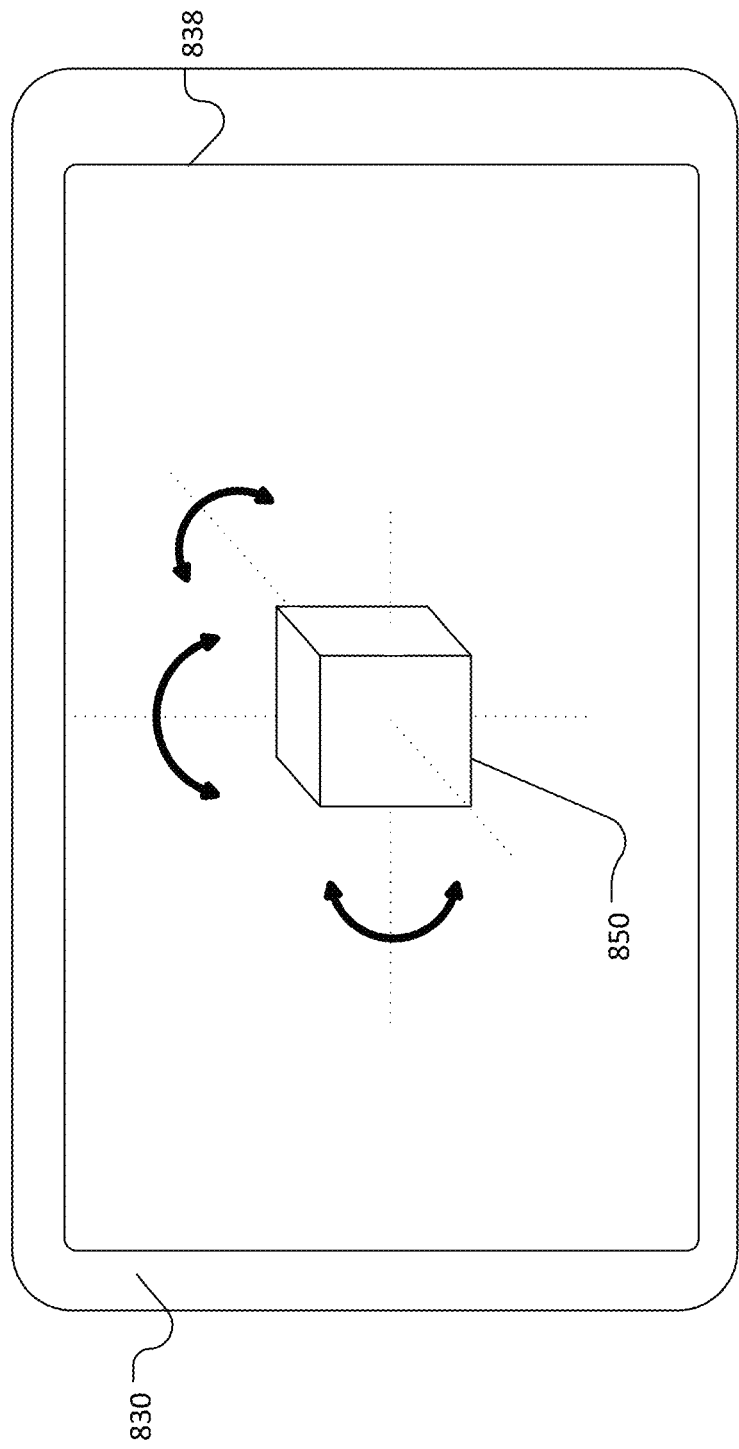
FIG. 8 is an on-screen display of a computing device showing a three-dimensional physical object capable of translation and rotation about three axes.

FIG. 8 is an on-screen display 838 of a computing device 830 showing a three-dimensional physical object 850 capable of rotation about three axes. The three-dimensional physical object 850, detected by camera 737, may appear on the display 838. Because the object 850 has unique fiducial markers on each face, its orientation may be detected and multiple sides are typically seen at once. Rotation and orientation may be tracked using only an image camera 737 (e.g. RGB, black and white, or ultraviolet).

Figure 9:
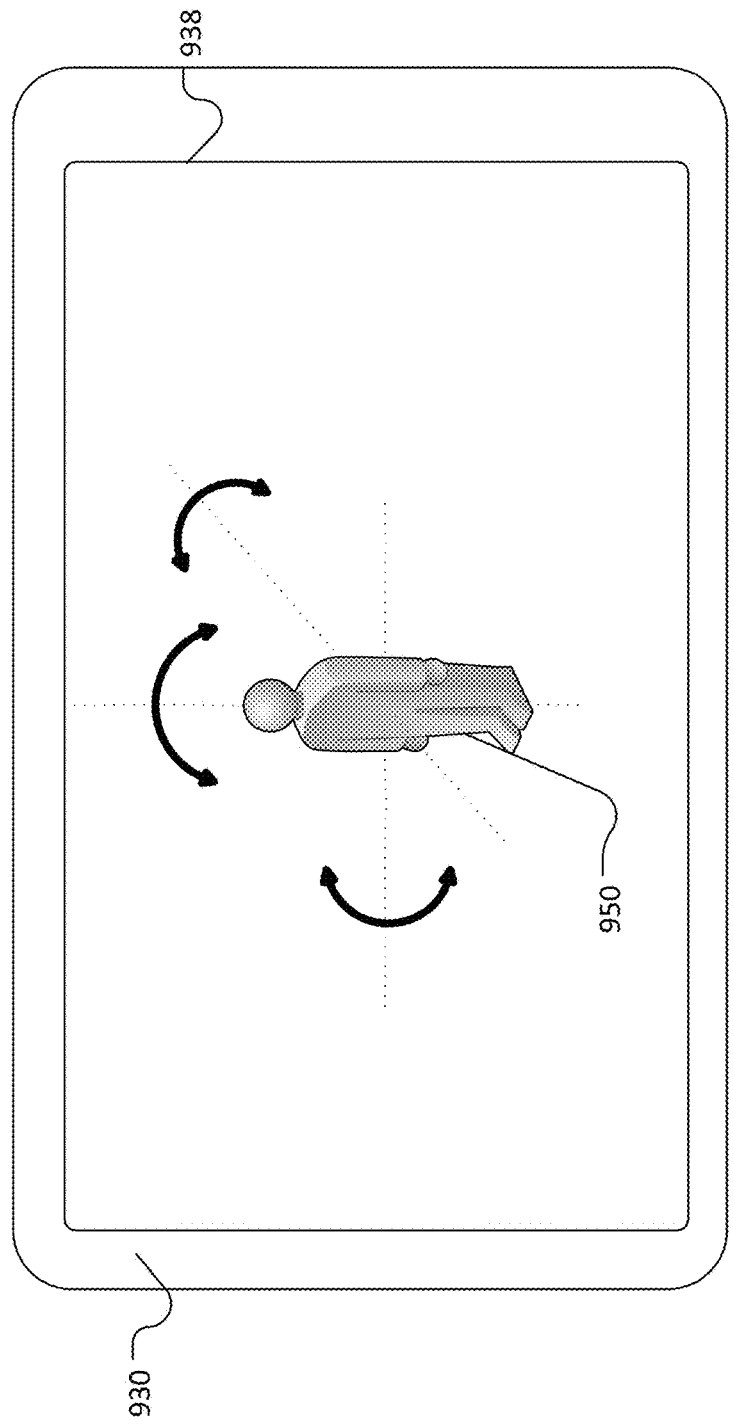
FIG. 9 is an on-screen display of a computing device showing a substitution of a rendered three-dimensional object in place of a physical three-dimensional object.

FIG. 9 is an on-screen display 938 of a computing device 930 showing a substitution of a rendered three-dimensional object 950 in place of a physical three-dimensional object 850. Here, the rendered three-dimensional object 950 on the display 938 replaces the actual three-dimensional object 850 being captured by the camera 737. The display 938 may present reality or a virtual environment in which the rendered three-dimensional object 950 is placed. And, the rotation may be tracked, along with the other functions described as taking place herein.

Figure 10:
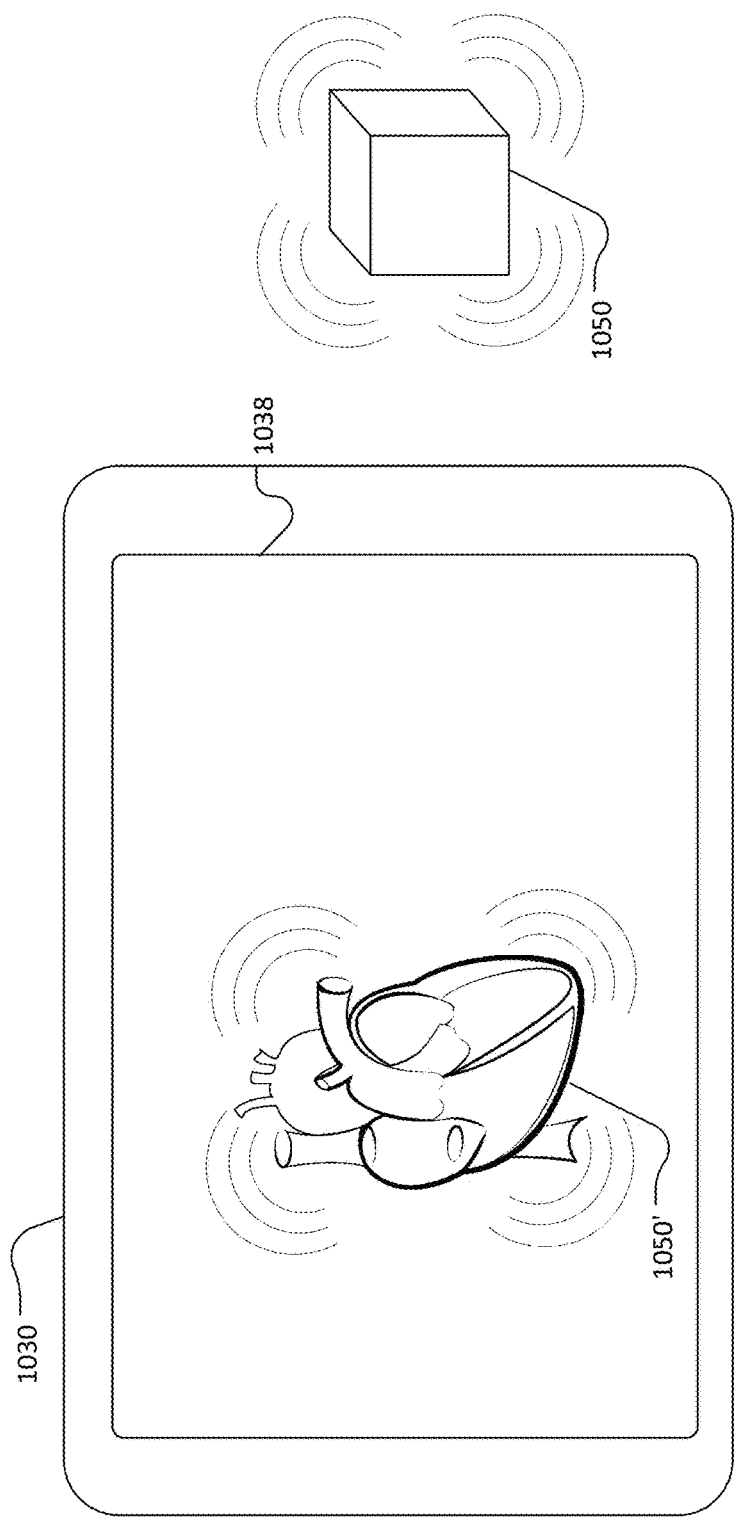
FIG. 10 is an example of a rendered object substituting for a three-dimensional physical object in an augmented reality display, the three-dimensional physical object incorporating dynamics associated with the rendered object.

FIG. 10 is an example of a rendered object 1050' substituting for a three-dimensional physical object 1050 in an augmented reality display 1038 of computer device 1030, the three-dimensional physical object 1050 incorporating dynamics associated with the rendered object 1050'.

As discussed above, the dynamics may be any number of things or a group of things generated by the various elements 352a-352h (FIG. 3). The dynamics of the heart shown as the rendered three-dimensional object 1050' may include the heartbeat, the heat, the roundedness of the cube based upon shape forming bladders. As a result, the real world three-dimensional physical object 1050 may "feel" in a manner similar to the rendered three-dimensional object's 1050' appearance on the display 1038. The dynamics may be updated to correspond to the object or to provide feedback for other interactions with the environment shown on the display 1038.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one It is claimed:

1. An apparatus comprising processor and memory, the processor executing instructions which cause the processor to:
   generate a three-dimensional environment on a display, the three-dimensional environment including an augmented reality object;
   detect, using a camera, the presence of a three-dimensional physical object bearing at least two unique fiducial markers, the fiducial markers physically connected to one another on the same three-dimensional physical object;
   detect movement of the three-dimensional physical object using the at least two unique fiducial markers; and
   alter the appearance of the augmented reality object within the three-dimensional environment on the display based upon the movement of the three-dimensional physical object.

2. The apparatus of claim 1 wherein the three-dimensional physical object is a cube with six unique fiducial markers, one on each face of the cube.

3. The apparatus of claim 1 wherein movement of the three-dimensional object alters a setting that may be adjusted upward and downward and wherein the movement of the three-dimensional object increases the setting upward with translation or rotation in one direction and decreases the setting downward with translation or rotation in a different direction.

4. The apparatus of claim 1 wherein the three-dimensional object moves a selection between elements of a plurality of sequentially ordered elements and wherein the movement of the three-dimensional object causes the user interface element to update to a later of the plurality of ordered elements with translation or rotation in one direction and cause the user interface element to update to an earlier of the plurality of ordered elements with translation or rotation in a different direction.

5. The apparatus of claim 1 wherein the three-dimensional object moves a selection between sizes, relative to a viewer, of one or more aspects of the three-dimensional environment and wherein the movement of the three-dimensional object causes the size to increase with translation or rotation in one direction and the size to decrease with translation or rotation in a different direction.

6. The apparatus of claim 1 wherein, upon detection of the three-dimensional physical object, the augmented reality object is superimposed in place of the three-dimensional physical object within the three-dimensional environment on the display and the movement of the three-dimensional physical object is translated into movement of the augmented reality object within the three-dimensional environment.

7. The apparatus of claim 1 wherein the three-dimensional environment incorporates a user avatar as the augmented reality object on the display, the avatar capable of movement in various directions within the three-dimensional environment, and wherein translation or rotation of the three-dimensional physical object in a first direction causes movement of the avatar at a first speed, and translation or rotation of the three-dimensional physical object in a different direction causes movement of the avatar at another associated speed.

8. A method of interacting with a three-dimensional environment comprising:
   generating the three-dimensional environment on a display, the three-dimensional environment including an augmented reality object;
   detecting, using a camera, the presence of a three-dimensional physical object bearing at least two unique fiducial markers, the fiducial markers physically connected to one another on the same three-dimensional physical object;
   detecting movement of a three-dimensional physical object bearing at least two unique fiducial markers using a camera;
   altering the appearance of the augmented reality object within the three-dimensional environment on the display based upon the movement of the three-dimensional physical object.

9. The method of claim 8 wherein the three-dimensional physical object is a cube with six unique fiducial markers, one on each face of the cube.

10. The method of claim 8 wherein movement of the three-dimensional object alters a setting that may be adjusted upward and downward and wherein the movement of the three-dimensional object increases the setting upward with translation or rotation in one direction and decreases the setting downward with translation or rotation in a different direction.

11. The method of claim 8 wherein the three-dimensional object moves a selection between elements of a plurality of sequentially ordered elements and wherein the movement of the three-dimensional object causes the user interface element to update to a later of the plurality of ordered elements with translation or rotation in one direction and cause the user interface element to update to an earlier of the plurality of ordered elements with translation or rotation in a different direction.

12. The method of claim 8 wherein the three-dimensional object moves a selection between sizes, relative to a viewer, of one or more aspects of the three-dimensional environment and wherein the movement of the three-dimensional object causes the size to increase with translation or rotation in one direction and the size to decrease with translation or rotation in a different direction.

13. The method of claim 8 wherein, upon detection of the three-dimensional physical object, the augmented reality object is superimposed in place of the three-dimensional physical object within the three-dimensional environment on the display and the movement of the three-dimensional physical object is translated into movement of the augmented reality object within the three-dimensional environment.

14. The method of claim 8 wherein the three-dimensional environment incorporates a user avatar as the augmented reality object on the display, the avatar capable of movement in various directions within the three-dimensional environment, and wherein translation or rotation of the three-dimensional physical object in a first direction causes movement of the avatar at a first speed, and translation or rotation of the three-dimensional physical object in a different direction causes movement of the avatar at another associated speed.

15. A system comprising:
   a computing device including a processor and memory;
   a camera in communication with the computing device;
   a three-dimensional physical object including at least two unique fiducial markers; and
   wherein the processor is for:

generating the three-dimensional environment on a display, the three-dimensional environment including an augmented reality object;

detecting, using the camera, the presence of a three-dimensional physical object bearing at least two unique fiducial markers, the fiducial markers physically connected to one another on the same three-dimensional physical object;

detecting movement of the three-dimensional physical object bearing the at least two unique fiducial markers by using a camera to determine, as the three-dimensional physical object translates or rotates, the absolute and relative positions of the two fiducial markers; and within the three-dimensional environment on the display based upon the movement of the three-dimensional physical object;

altering the appearance of the augmented reality object within the three-dimensional environment on the display based upon the movement of the three-dimensional physical object as indicated by the absolute and relative positions of the two fiducial markers.

16. The system of claim 15 wherein the at least two unique fiducial markers are multi-layered fiducial markers incorporating larger and smaller fiducial markers into each face capable of detection using computer vision techniques at multiple depths.

17. The system of claim 16 wherein the processor performs motion tracking on the three-dimensional object to detect the movement.

18. The system of claim 17 wherein the computer vision system detects movement of the three-dimensional object at a first depth using a first layer of the multi-layered fiducial markers and at a second depth using a second layer of the multi-layered fiducial markers.

19. The system of claim 15 wherein each of the six unique fiducial markers is at least one of a selected one of: a high-contrast image, incorporates a particular color, incorporates a lighted element of a particular color, includes a light-reflecting material of a particular color, and has three-dimensional characteristics for an associated image.

20. The system of claim 15 wherein the computing device is a selected one of a mobile phone, a tablet computer, a handheld computer, a virtual reality headset, an augmented reality headset, and a digital camera.

* * * * *